United States Patent
Steiss

(10) Patent No.: US 7,206,922 B1
(45) Date of Patent: Apr. 17, 2007

(54) INSTRUCTION MEMORY HIERARCHY FOR AN EMBEDDED PROCESSOR

(75) Inventor: Donald Steiss, Richardson, TX (US)

(73) Assignee: Cisco Systems, Inc., San Jose, CA (US)

( * ) Notice: Subject to any disclaimer, the term of this patent is extended or adjusted under 35 U.S.C. 154(b) by 401 days.

(21) Appl. No.: 10/749,912

(22) Filed: Dec. 30, 2003

(51) Int. Cl.
G06F 9/30 (2006.01)
G06F 13/00 (2006.01)

(52) U.S. Cl. ...................... 712/216; 711/151
(58) Field of Classification Search .............. None
See application file for complete search history.

(56) References Cited

U.S. PATENT DOCUMENTS

| | | | |
|---|---|---|---|
| 5,235,595 A * | 8/1993 | O'Dowd | 370/392 |
| 5,555,152 A * | 9/1996 | Brauchle et al. | 361/103 |
| 5,613,114 A | 3/1997 | Anderson et al. | |
| 5,724,586 A | 3/1998 | Edler et al. | |
| 5,742,822 A | 4/1998 | Motomura | |
| 5,771,382 A | 6/1998 | Wang et al. | |
| 5,799,188 A | 8/1998 | Manikundalam et al. | |
| 5,907,702 A | 5/1999 | Flynn et al. | |
| 5,913,049 A | 6/1999 | Shiell et al. | |
| 6,016,542 A | 1/2000 | Gottlieb et al. | |
| 6,073,159 A | 6/2000 | Emer et al. | |
| 6,076,157 A | 6/2000 | Borkenhagen et al. | |
| 6,105,051 A | 8/2000 | Borkenhagen et al. | |
| 6,212,544 B1 | 4/2001 | Borkenhagen et al. | |
| 6,216,220 B1 | 4/2001 | Hwang | |
| 6,219,763 B1 * | 4/2001 | Lentz et al. | 711/151 |
| 6,223,208 B1 | 4/2001 | Kiefer et al. | |
| 6,256,775 B1 | 7/2001 | Flynn | |
| 6,272,520 B1 | 8/2001 | Sharangpani et al. | |
| 6,292,888 B1 | 9/2001 | Nemirovsky et al. | |
| 6,308,261 B1 | 10/2001 | Morris et al. | |
| 6,341,347 B1 | 1/2002 | Joy et al. | |
| 6,345,345 B1 * | 2/2002 | Yu et al. | 711/151 |
| 6,353,881 B1 | 3/2002 | Chaudhry et al. | |
| 6,385,715 B1 | 5/2002 | Merchant et al. | |
| 6,411,982 B2 | 6/2002 | Williams | |
| 6,418,458 B1 | 7/2002 | Maresco | |

(Continued)

OTHER PUBLICATIONS

Boothe, B. and Ranade, A.G., "Improved Multithreading Techniques for Hiding Communication Latency in Multiprocessors," ACM 1992, pp. 214-223.

(Continued)

*Primary Examiner*—Eddie Chan
*Assistant Examiner*—Jacob Petranek
(74) *Attorney, Agent, or Firm*—Fenwick & West LLP

(57) ABSTRACT

The present invention provides a processor with an instruction memory hierarchy and a method for distributing instructions to an array of multithreaded processing units organized in processor clusters. The instruction memory hierarchy comprises a processor cluster, an instruction request bus, an instruction request arbiter, and an instruction memory. The instruction request arbiter controls submissions of instruction requests from multithreaded processing units within the processor clusters to the instruction memory. The processor clusters send instruction requests responsive to a cache miss by a processor, or processor thread, within the processor cluster. The instruction request arbiter resolves conflicts between instruction requests attempting to access to a common cache set within the instruction memory. The instruction memory broadcasts instruction data to the processor clusters responsive to non-conflicting instruction requests forwarded from the instruction request arbiter.

48 Claims, 7 Drawing Sheets

U.S. PATENT DOCUMENTS

| | | |
|---|---|---|
| 6,477,562 B2 | 11/2002 | Nemirovsky et al. |
| 6,490,612 B1 | 12/2002 | Jones et al. |
| 6,507,862 B1 * | 1/2003 | Joy et al. ............... 718/107 |
| 6,530,000 B1 * | 3/2003 | Krantz et al. ............ 711/151 |
| 6,535,905 B1 | 3/2003 | Kalafatis et al. |
| 6,542,920 B1 | 4/2003 | Belkin et al. |
| 6,542,921 B1 | 4/2003 | Sager |
| 6,542,987 B1 | 4/2003 | Fischer et al. |
| 6,556,045 B2 | 4/2003 | Cohen |
| 6,567,839 B1 | 5/2003 | Borkenhagen et al. |
| 6,584,488 B1 | 6/2003 | Brenner et al. |
| 6,594,755 B1 | 7/2003 | Nuechterlein et al. |
| 6,769,033 B1 * | 7/2004 | Bass et al. ............... 709/246 |
| 6,928,525 B1 * | 8/2005 | Ebner et al. ............. 711/150 |
| 2001/0056456 A1 | 12/2001 | Cota-Robles |
| 2002/0010733 A1 | 1/2002 | Baba et al. |
| 2003/0154235 A1 | 8/2003 | Sager |
| 2003/0158885 A1 | 8/2003 | Sager |

OTHER PUBLICATIONS

Gulati, M. and Bagherzadeh, N., "Performance Study of a Multithreaded Superscalar Microprocessor," 2$^{nd}$ Internatioanl Symposium on High-Performance Computer Architecture, Feb. 1996, 11 pages.

Loikkanen, M. and Baghersadeh, N., "A Fine-Grain Multithreading Superscalar Architecture," Proc. 1996 Confer. Parallel Architectures and Compilation Techniques, Oct. 1996, 6 pages.

Tullsen, D. M. et al., "Exploiting Choice: Instruction Fetch and Issue on an Implementable Simultaneous Multithreading Processor," Proc. Of the 23$^{rd}$ ISCA, May 1996, 12 pages.

Tullsen, D. M. et al., "Simultaneous Multithreading: Maximizing On-Chip Parallelism," Proc. Of the 22$^{nd}$ ISCA, Jun. 1995, 12 pages.

Yamamoto, W., "An Analysis of Multistreamed, Superscalar Processor Architectures," Ph.D. Thesis, U.C. Santa Barbara, Dec. 1995, pp. 1-155.

* cited by examiner

INSTRUCTION MEMORY HIERARCHY FOR AN EMBEDDED PROCESSOR

BACKGROUND OF THE INVENTION

1. Field of the Invention

This invention relates generally to a computer processor, and more specifically, to a network processor having an instruction memory hierarchy that distributes instructions to a plurality of processing units organized in clusters within the network processor.

2. Background Art

Until recently, a lack of network bandwidth posed restraints on network performance. But emerging high bandwidth network technologies now operate at rates that expose limitations within conventional computer processors. Even high-end network devices using state of the art general purpose processors are unable to meet the demands of networks with data rates of 2.4-Gbs, 10-Gbs, 40-Gbs and higher.

Network processors are a recent attempt to address the computational needs of network processing which, although limited to specialized functionalities, are also flexible enough to keep up with often changing network protocols and architecture. Compared to general processors performing a variety of tasks, network processors primarily perform packet processing tasks using a relatively small amount of software code. Examples of specialized packet processing include packet routing, switching, forwarding, and bridging. Some network processors have arrays of processing units with multithreading capability to process more packets at the same time. However, current network processors have failed to address certain characteristics of network processing by relying too much on general processing architectures and techniques.

Access to instructions is one problem associated with a processing array having a conventional memory architecture. During an instruction fetch stage in a processing unit pipeline, each processing unit retrieves software code for execution during an execution stage from a memory element. In some typical processing arrays, each processing unit has dedicated instruction memory. But dedicated memory consumes valuable die area on the processor and inefficiently replicates the same code. In other typical processing arrays, processing units share a common instruction memory. But competition for memory access between processing units increases latencies during an instruction fetch pipeline stage. Furthermore, memory has limited bandwidth that is not capable of delivering instructions at a rate required by a processing array performing packet processing.

Limited instruction memory bandwidth causes more severe problems in processor arrays with multithreaded processing units. In hardware-level multithreading, a logically-partitioned processor streams instructions through its pipeline for more than one hardware thread at the same time to improve effective CPIs (Cycles Per Instruction). Each hardware thread can be associated with a different application program or network packet. When one thread experiences a stall caused by, for example, a memory access latency during the execution stage, the processing unit switches execution to a different thread rather than wasting execution cycles.

By contrast, in software-level multithreading, a single application program streams instructions to the processor using several software threads or processes. "Multithreading" and "threads" as used herein, however, refer to hardware multithreading and hardware instruction threads, respectively. Because multithreaded processing units have higher CPIs (i.e., instructions processed each cycle), even more instruction memory bandwidth is needed for instruction fetches. Moreover, since each thread has an independent instruction stream, there is even more contention for available memory bandwidth.

Therefore, what is needed is a processor including an instruction memory hierarchy and method of distributing instructions to an array of multithreaded processing units. Furthermore, there is a need for an instruction request arbiter and method for controlling instruction requests from the array of multithreaded processing units to the instruction memory hierarchy.

SUMMARY OF THE INVENTION

The present invention meets these needs by providing a processor with an instruction memory hierarchy and method for distributing instructions to an array of multithreaded processing units. In one embodiment, the instruction memory hierarchy comprises a plurality of processing units, an instruction request arbiter, and an instruction memory. A signal line, such as an instruction request bus, coupled to outputs of the plurality of processing units and to an input of the instruction request arbiter, sends signals representing instruction requests. A signal line, coupled to a first output of the instruction memory arbiter and to an input of the instruction memory, forwards signals representing non-conflicting instruction requests. A signal line, coupled to an output of the instruction memory and to inputs of the plurality of processing units, sends signals representing instruction data. The instruction request arbiter receives instruction requests comprising requests to the instruction memory to fill processor instruction cache sublines. A first embodiment of the instruction request arbiter controls instruction request submissions from each of the plurality of processing units, and also resolves conflicts between instruction requests. The instruction memory broadcasts instruction data responsive to non-conflicting instruction requests forwarded from the instruction request arbiter.

A second embodiment of the instruction request arbiter controls instruction request submissions from the plurality of processors with a traffic mode. The instruction request bus comprises a pipelined slotted ring that couples a second output of the instruction request arbiter to second inputs of the plurality of processors and the instruction arbiter input. The instruction request arbiter broadcasts a high traffic mode signal to the plurality of processors responsive to an average amount of instruction requests exceeding a limit. During high traffic mode, the plurality of processing units send instruction requests at scheduled times. The instruction request arbiter also broadcasts a low traffic mode signal to the plurality of processing units responsive to the average amount of instruction requests being within a limit. During low traffic mode, the plurality of processing units send instruction requests during empty slots.

A third embodiment of the instruction request arbiter resolves conflicts between instruction requests based on instruction priorities. Instruction requests comprise one or more priority bits whereby, for example, a high priority indication is associated with a critical instruction request. The instruction request arbiter resolves conflicts between instruction requests having different priorities (e.g., in an embodiment with two-level priority having a high priority instruction request and a low priority instruction request) by selecting the high priority instruction request. The instruction request arbiter increments, and possibly saturates, the priority of the unselected instruction request to a higher priority instruction request before recirculating it around the slotted ring. The instruction request arbiter resolves conflicts between instructions having the same priority (e.g., a first high priority request and a second high priority request) by using round-robin arbitration. The unselected request is incremented if low priority, and recirculated.

DETAILED DESCRIPTIONS OF THE PREFERRED EMBODIMENTS

I. Introduction

Many variations will be apparent to one of ordinary skill in the art that would yet be encompassed by the spirit and scope of the invention. For example, although the present invention provides optimum performance to a network processing system, it may be implemented in any many other environments such as in a supercomputer, a personal computer, a workstation, a PDA (Personal Digital Assistants), a digital signal processing system, or the like. Accordingly, the below description is included to illustrate the operation of the preferred embodiments and is not meant to limit the scope of the invention. Rather, the scope of the invention is to be limited only by the claims that follow.

II. Network Processing System

Figure 1:
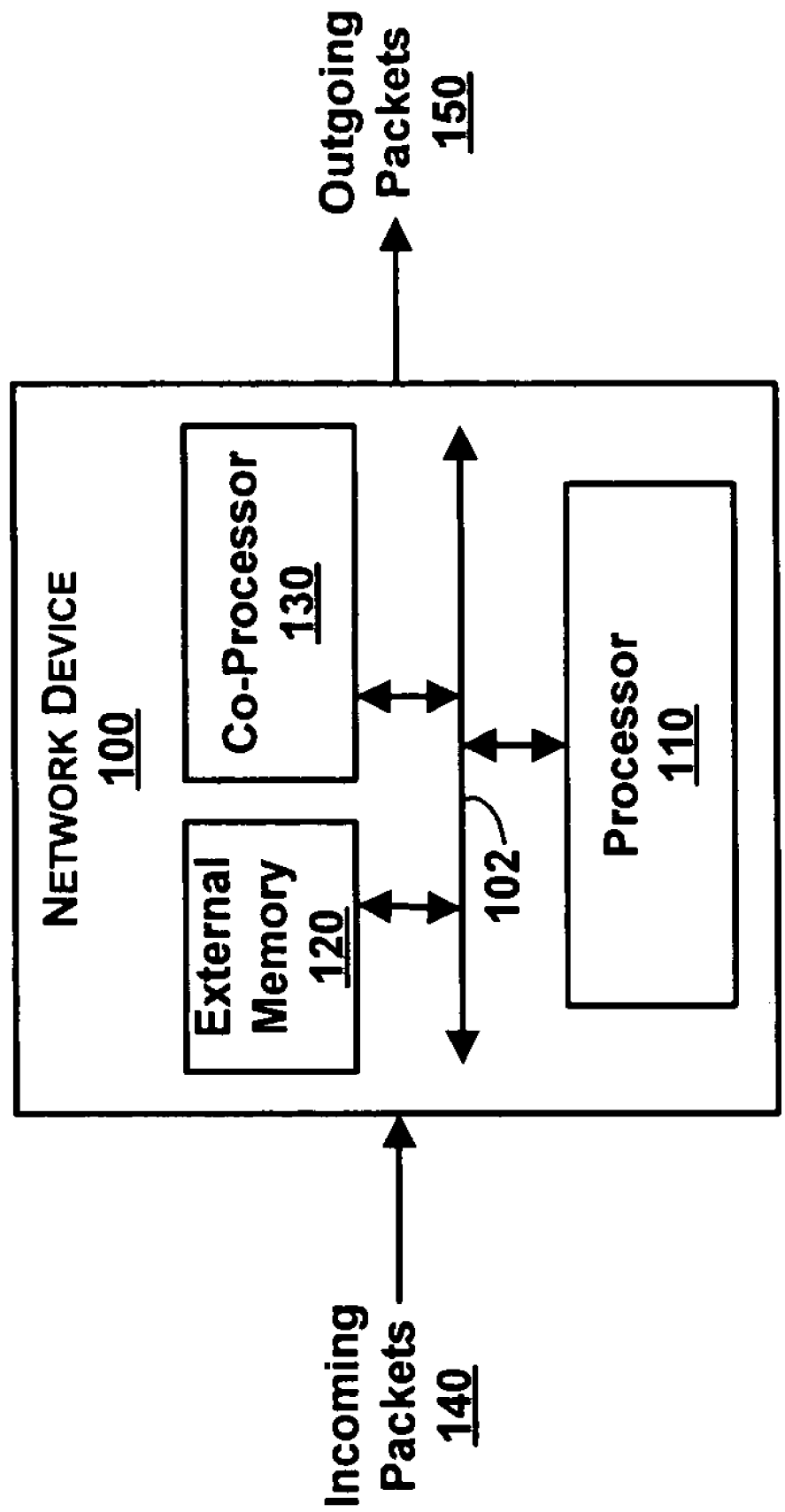
FIG. 1 is a block diagram illustrating a network processing system according to one embodiment of the present invention.

FIG. 1 is a block diagram illustrating a network processing system 100 according to one embodiment of the present invention. The system 100 comprises a processor 110, external memory 120, and a co-processor 130 each coupled by signal line (or bus) 102. The system 100 may be a specialized computing device such as a router, a switch, a bridge, a gateway, or a combination of devices such as the 12000-series systems manufactured and sold by Cisco Systems, Inc. of Sunnyvale, Calif. The system 100 processes incoming packets 140 received from a network (not shown) resulting in outgoing packets 150 sent through the network. More specifically, the processor 110 operates in conjunction with the co-processor 130 to perform various tasks such as routing, switching, bridging, and packet forwarding using various network protocols such as TCP/IP (Transmission Control Protocol/Internet Protocol), ATM (Asynchronous Transfer Mode), IEEE 802.3, IEEE 802.11, etc. The system 100 operates to service high-speed networks with bandwidths of 2.4-Gbs, 10-Gbs, 40-Gbs, and above. In one embodiment, an operating system such as VxWorks by WindRiver of Alameda, CA or other controlling software manages interactions between the hardware and software. One of ordinary skill in the art will recognize various configurations of the network device 110 within the scope of the present invention.

The processor 110 executes packet processing instructions to process the incoming packets 140. The processor 110 comprises, for example, an x86-type processor, a network processor, a multithreaded processor, a multiple instruction multiple data processor, a general processing unit, an application specific integrated circuit, or any processing device capable of processing instructions. The processor 110 is implemented as, for example, an integrated circuit on substrates such as silicon or geranium, a field programmable device, a nanotechnology-based chip, or any other type of chip for implementing logic functionality at high data rates. In one embodiment, the processor 110 is implemented as described with reference to FIGS. 2–4 performing methods described with reference to FIGS. 5–7.

Packet processing instructions comprise a set of general purpose instructions, packet processing extensions, or other software code that is executed by the processor 110. Examples of packet processing extensions include bit field manipulation instructions, checksum acceleration instructions, and encryption instructions. In one embodiment, at least some instructions include an external priority set by a programmer or other software such as during critical packet processing. The external priority influences arbitration between conflicting instruction requests as described below.

The external memory 120 provides large capacity, albeit long latency, storage for packet processing instructions 120. Preferably, the external memory 120 is limited to storing rarely used code. The external memory 120 comprises, for example, SRAM, EEPROM, or any other memory element capable of storing packet processing instructions. Note that instruction fetches to the external memory 120 by the processor 110 may cause latencies and thread stalls. In one implementation, the external memory 120 contains 128 MB of addressable space. Operation of the external memory 120 within the memory hierarchy is described below with reference to FIG. 3.

The co-processor 130 performs processing tasks to support the processor 110. The co-processor 130 comprises, for example, a CAM (Content Addressable Memory) device to provide ACL (Access Control List) look-ups, a search engine to provide packet forwarding tasks, a buffer to store incoming and outgoing packets 130, 140, and the like.

Figure 2:
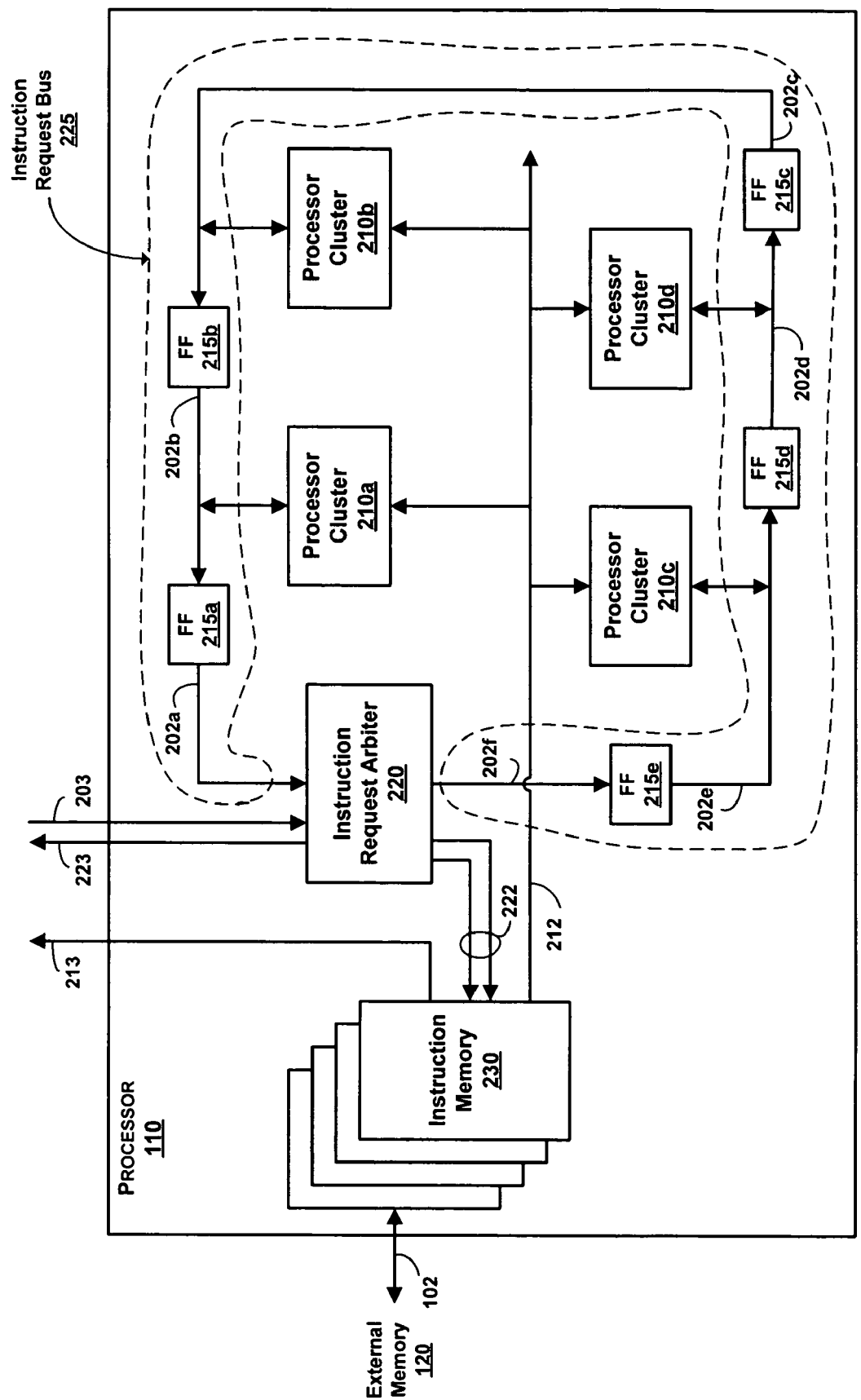
FIG. 2 is a block diagram illustrating the processor according to one embodiment of the present invention.

FIG. 2 is a block diagram illustrating the processor 110 according to one embodiment of the present invention. The processor 110 comprises an instruction memory 230, an instruction request arbiter 220, and processor clusters 210*a*–*d*, and an instruction request bus 225 (collectively referring to signal lines 202*a*–*f* and flip flops 215*a*–*e*).

The instruction request bus 225 is coupled to first inputs and outputs of the processor clusters 210*a*–*d* and to an input of the instruction request arbiter 220, and signal lines 222 are coupled to a first output of the instruction request arbiter 220 and to an input of the instruction memory 230. Signal line 212 is coupled to a first output of the instruction memory 230 and to second inputs of the processor clusters 210*a*–*d*. Signal line 102 is coupled to a second output of the instruction memory 230 to send signals to the external memory 120. Additionally, signal line 203 is coupled to an input of the processor 110 and the input of the instruction request arbiter 220, and signal line 223 is coupled to a third output of the instruction request arbiter 220 and a first output of the processor. Signal line 213 is also coupled to the first output of the instruction memory 230 and a second output of the processor 110. Signal line 102 is coupled to an input/output of the instruction memory 230 and the input/output of the processor 110.

In general, the instruction request arbiter 220 receives and forwards instruction requests from the processor clusters 210a–d to the instruction memory 230 through the instruction request bus 225. In response to a forwarded instruction request, the instruction memory 230 broadcasts a corresponding instruction to the processor clusters 210a–d. In one embodiment, an off-chip instruction request bus coupled to off-chip processor clusters (not shown) is coupled to signal lines 203, 223, 213 to access instructions from the multi-memory bank 230. One or ordinary skill in the art will recognize additional configurations of processor clusters 210a–d and off-chip processor clusters within the scope of the present invention.

The processor clusters 210a–d comprise one or more processing units that share access to the instruction request bus 225. The processor clusters 210a–d access the instruction request bus 225 through signal lines 202b–e, respectively, to send instruction requests according to either the high or low traffic mode policy. In high traffic mode, the processor clusters 210a–d submit instruction requests according to a globally synchronized counter (not shown). The processor clusters 210a–d receive corresponding instruction data by snooping, i.e., testing all instruction broadcasts from the instruction memory 230 on signal line 212 against currently outstanding instruction requests in the processor cluster 210. The processor clusters 210a–d are described further below with reference to FIG. 3.

The instruction request bus 225 transports instruction requests from the processor clusters 210a–d to the instruction request arbiter 220. The instruction request bus 225 comprises: signal line 202f coupled to the second output of the instruction request arbiter 220 and an input of flip flop 215e; signal line 202e coupled to an output of flip flop 215e and an input of flip flop 215d; signal line 202d coupled to an output of flip flop 215d and an input of flip flop 215c; signal line 202c coupled to an output of flip flop 215c and an input of flip flop 215b; signal line 202b, coupled to an output of flip flop 215b and an input of flip flop 215a; and signal line 202a coupled to an output of flip flop 215a and the input of the instruction request arbiter 220. Flip flops 215a–e store bits representing instruction requests (or lack of) and traffic modes. In another embodiment, the instruction request bus 225 comprises buffers, registers, or other memory elements for pipelining. The instruction request bus 225 comprises, for example, a pipelined slotted ring bus. An instruction request format comprises, for example, $bit_0$ indicating validity; $bits_{1-2}$ indicating priority; $bit_3$ containing a critical subline flag; $bits_{4-30}$ containing a cache subline address; and $bit_{31}$ indicating a traffic mode.

The instruction request arbiter 220 controls access to the instruction request bus 225 with traffic modes. The instruction request arbiter 220 sets a traffic mode on the instruction request bus 225 as either high or low depending on an average number of instruction requests. Flip-flops 215a–e send the traffic mode, or control bit, to the processor clusters 210a–d. In low traffic mode, empty instruction request bits, an invalid instruction request flag, a low traffic mode bit, or other indicator from the flip-flops 215a–e signify that an instruction request can be submitted by a processor cluster 210. In high traffic mode, the flip-flops 215a–e provide synchronizing information, such as a count or counter reset, to the processor clusters 210a–d. Each processor cluster 210, in the count example, submits instructions requests at an assigned offset from the count.

The instruction request arbiter 220 also controls access to the instruction memory by selecting non-conflicting instruction requests to forward. Conflicting instruction requests require access to a common group of cache sets of the instruction memory 230. The instruction request arbiter 220 resolves conflicting instruction requests using either priority levels associated with the instruction requests or round-robin arbitration. In one embodiment, the instruction request arbiter 220 accepts instruction requests from more than one instruction request bus 225, and forwards more than one instruction request to the instruction memory 230. The instruction request arbiter 220 and related methods are described below in more detail.

The instruction memory 230 stores packet processing instructions executed by the processor clusters 210a–d. The instruction memory 230 responds to non-conflicting instruction requests forwarded by the instruction request arbiter 220 by broadcasting corresponding instruction data on one or both of signal lines 212, 214. Instruction requests are read requests of an address potentially stored in the instruction memory 230. Instruction requests containing addresses not found in the instruction memory 230 are sent to the external memory 120 through signal line 102. Preferably, the instruction memory 230 is clocked at a core rate. The instruction memory 230 comprises, for example, a set associative instruction cache, a multiple bank memory, an SRAM, a DRAM, or any other memory element capable or storing instructions. In one implementation, the instruction memory 230 is 128 kB and 8 way banked with 16 cache sets per bank referred to as a group of cache sets. The instruction memory 230 may operate at the core clock rate. A read width is a subline that may be 32 bytes.

In one embodiment, signal lines 212, 213 are, for example, result buses, fill buses, or any signal lines capable of broadcasting instructions. Preferably, signal lines 212, 213 are clocked at the core rate. As described, processor clusters 210a–d retrieve instruction data from signal line 212 matching posted instruction requests. If instruction data does not match any posts, as in the case of a branch mispredictions or exceptions, the instruction data is ignored. In one example, the signal lines 212, 213 have a width of 285 bits with $bit_0$ indicating instruction validity, $bits_{1-27}$ containing a cache subline address, $bits_{28-283}$ containing subline data, and $bit_{284}$ containing a parity bit.

In another embodiment the instruction memory 230 comprises a cache control mechanism (not shown) to manage which instructions are stored. Accordingly, an instruction address can be: non-cached in the processor cluster 210, but cached in the instruction memory 230; non-cached in the processor cluster 210 and non-cached in the instruction memory 230; cached in the processor cluster 210 and cached in the instruction memory 230; or cached in the processor cluster 210, but non-cached in the instruction memory 230.

III. Instruction Memory Hierarchy

Figure 3:
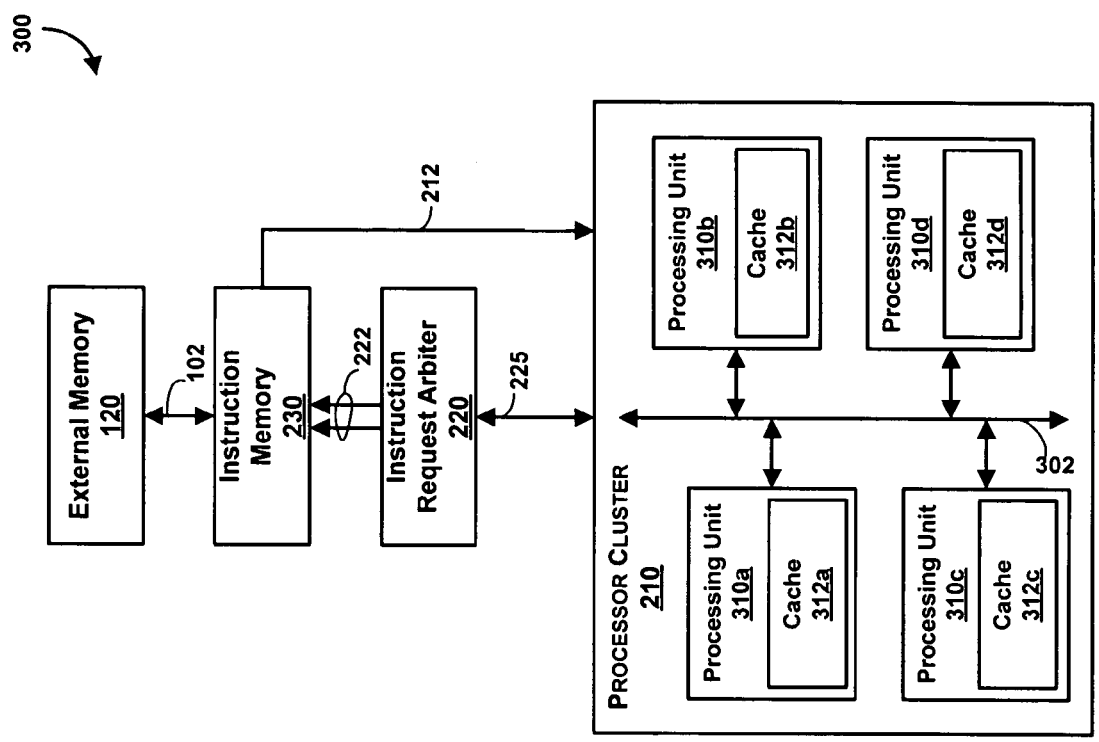
FIG. 3 is a block diagram illustrating an instruction memory hierarchy according to one embodiment of the present invention.

FIG. 3 is a block diagram illustrating an instruction memory hierarchy 300 of according to one embodiment of the present invention. The memory hierarchy 300 comprises a processor cluster 210 including a plurality of processing units 310a–d with caches 312a–d, the instruction request arbiter 220, the instruction memory 230, and the external memory 120. Signal line 302 couples outputs of the processing units 310a–d to an input/output of the processor cluster 210. The instruction request bus 225 couples the input/output of the processor cluster 210, to the input of the instruction request arbiter 220. As described above, the instruction request arbiter 220 is coupled to the instruction memory 230, which in turn, is coupled to the external memory 120. Also, the instruction memory 230 is coupled to an input of the processor cluster 210.

An instruction request from one of the processing units moves up the memory hierarchy 300 until there is a matching instruction address. More specifically, if there is a cache subline miss in a processor's cache 312, the instruction request moves to the instruction memory 230, and if the instruction memory 230 experiences a miss, the instruction request moves to the external memory 230. One of ordinary skill in the art will recognize that variations of the memory hierarchy 300, such as additional levels of memory contained within each processing unit 310a–d, are within the scope of the present invention.

The processor cluster 210 comprises four processing units 310a–d. However, one of ordinary skill will recognize that the processor cluster 210 can comprise any number of processing units 310. The processing units 310a–d processes packet processing instructions related to packet routing, switching, bridging, and forwarding. The processing units 310a–d comprise, for example, a processing core, a network processing core, a multiple instruction multiple data core, a parallel processing element, a controller, or any other pipelined device for processing instructions. In an instruction fetch stage, the processing units 310a–d retrieve packet processing or other instructions from the memory hierarchy 300. The processing units 310a–d decodes the packet processing instructions and executes decoded instructions in an execution stage. In one embodiment, the processing units 310a–d comprise one or more multithreaded processing units capable of processing several threads through its pipeline at the same time. In this embodiment, the processing units 310a–d process multiple instruction threads, $T_m^k$, where, for example, in =2, 4, 128 or more multithreaded instructions and k=the $k^{th}$ instruction from thread m. Multithreaded processing units are described in greater detail in U.S. patent application Ser. No. 09/595,076 which is incorporated herein by reference in its entirety. In the multithreaded embodiment, each thread within a processing unit 310 submits instruction requests responsive to a cache miss in the processor's cache 312.

In one embodiment, the multithreaded processing units 310a–d comprise a bus interface (not shown) to manage accesses to the instruction request bus 225. The bus interface includes a counter to keep track of slots dedicated to the multithreaded processing unit 310a–d during high traffic mode. In high traffic mode, the bus interface selects an instruction request, for example, every 16 cycles. In low traffic mode, the bus interface can select an instruction request whenever a neighboring processor cluster 210 had an unused time slot. The bus interface prioritizes instruction requests by priority and arrival time. The bus interface selects the lowest numbered request with the smallest timestamp for the next subline request.

In one embodiment, a cluster instruction cache (not shown) is shared by the processing units 310a–d, to provide low latency storage of recently accessed code. The cluster instruction cache receives instruction requests during the fetch stage of a processing unit 310a–d responsive to cache misses in the processor's cache 312. If the requested address is found, the cluster instruction cache returns associated instruction data. However, if there is a cache miss, the cluster instruction cache sends a request to the instruction memory 230. The cluster instruction cache listens to or snoops on signal line for corresponding instruction data broadcast by the instruction memory 230. In one implementation, the cluster instruction cache capacity is 16 kB.

The instruction memory 230, shared by the processor clusters 210a–d, provides medium latency storage for preferably most of the code. The external memory 120, shared by all processing units 310 on the processor 110, provides high latency storage for preferably rarely used code.

Figure 4:
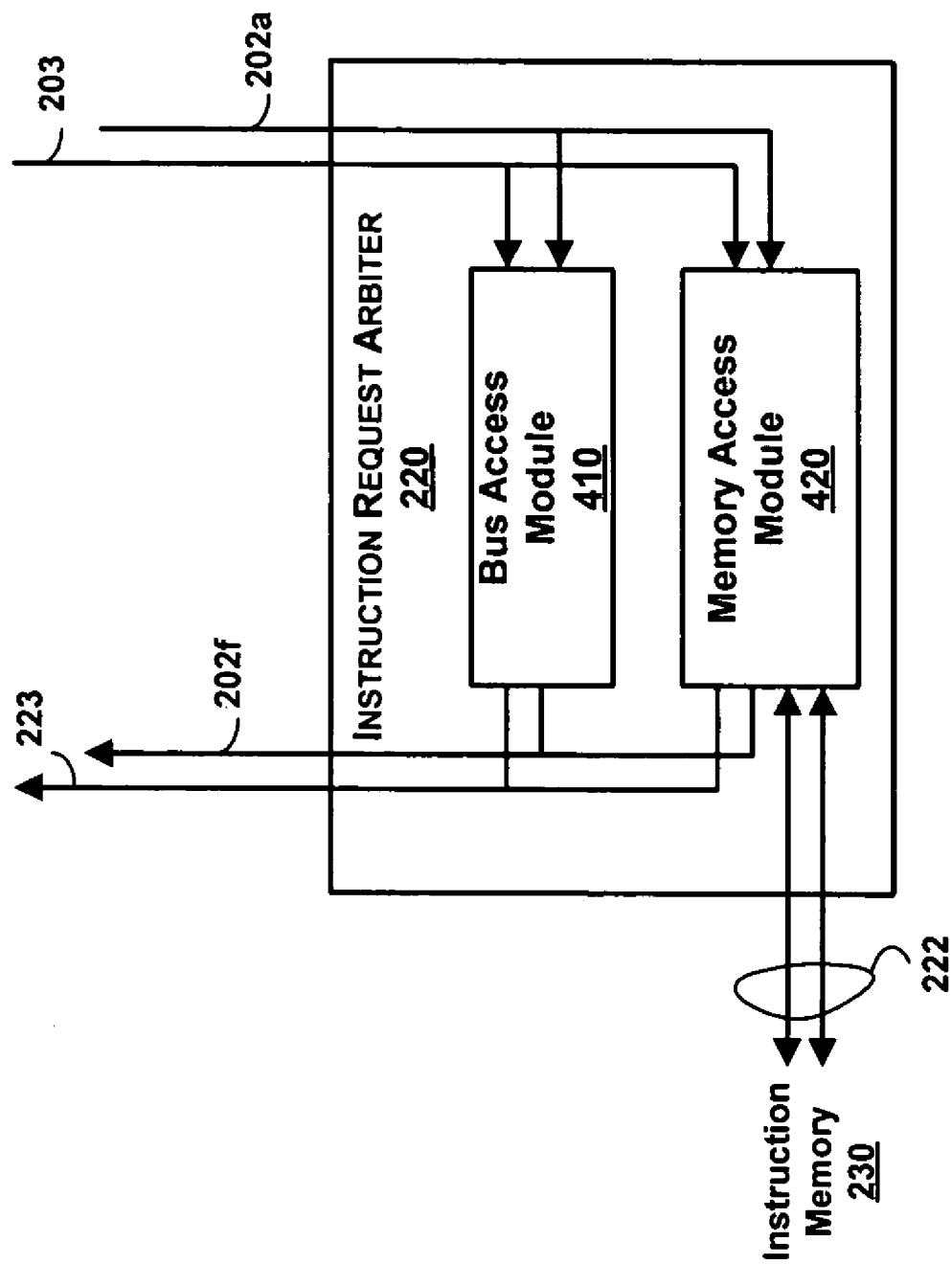
FIG. 4 is a block diagram illustrating the instruction request arbiter according to one embodiment of the present invention.

FIG. 4 is a block diagram illustrating the instruction request arbiter 220 according to one embodiment of the present invention. The instruction request arbiter 220 comprises a bus access module 410 and a memory access module 420. The instruction request buses are coupled to an input of the bus access module 410 and an input of the memory access module 420. Signal lines 202a, 203 are coupled to the input of the instruction request arbiter 220 and inputs of the bus access module 410 and the memory access module 420. Signal lines 222 are coupled to a first output of the memory access module 420 and the first output of the instruction request arbiter. Signal lines 202f, 223 are coupled to a second output of the bus access module 410, an output of the memory access module 420 and to the first output of the instruction request arbiter.

The bus access module 410 controls access of the processor clusters 210a–d to the instruction request bus 225 by determining a traffic mode. The bus access module 410 computes an average number of instruction requests during a period of time. The bus access module 410 broadcasts a high traffic mode responsive to the instruction request average exceeding a limit and a low traffic mode responsive to the instruction request average within the limit. In one example, if there are 15 or more instruction requests over a 64-clock cycle interval, the instruction request arbiter 220 sets the traffic mode to high. One of ordinary skill in the art will recognize various other traffic modes and mode detection methods within the scope of the present invention. The bus access module 410 and related methods are described in more detail below with reference to FIG. 6.

The memory access module 420 controls access to the instruction memory 230 by detecting and resolving conflicting instruction requests. The memory access module 420 detects conflicting instruction requests that attempt a read and/or write operation to the same memory bank within the instruction memory 230. To resolve conflicts between instruction requests having the same priority level (e.g., a first high priority instruction request and a second high priority instruction request), the memory access module 420 uses round-robin arbitration. For example, the memory access module 420 can use a counter with representations for each of the processing units 310. The instruction request comprises an identification associated with a requesting processing unit 310. Whichever requesting processing unit 310 is next in line from the current count, is selected. One of ordinary skill in the art will recognize that, although the instruction request arbiter 220 is shown in FIG. 4 as receiving instruction requests from two instruction request busses 225, variations are within the scope of the present invention. Similarly, the instruction request arbiter 220 is shown in FIG. 4 as outputting two non-conflicting instruction requests to the instruction memory 230 may vary.

If the instruction requests have different priority levels (e.g., in a two-level priority embodiment, a high priority instruction request and a low priority instruction request), the memory access module 420 selects the instruction request with higher priority. A critical instruction request is one example of a high priority request. More specifically, the processing unit 310 can designate the first access of a multiple-access transaction, which contains an address with dependencies blocking program execution as a critical instruction request. Additionally, the memory access module 420 increments, and possibly saturates, the priority level of the losing instruction request from low to high prior to recirculating the instruction request around the instruction request buses. One of ordinary skill in the art will recognize varying priority schemes with more than two priority levels within the scope of the present invention. The memory access module 420 and related methods are described in more detail below with reference to FIG. 7.

Figure 5:
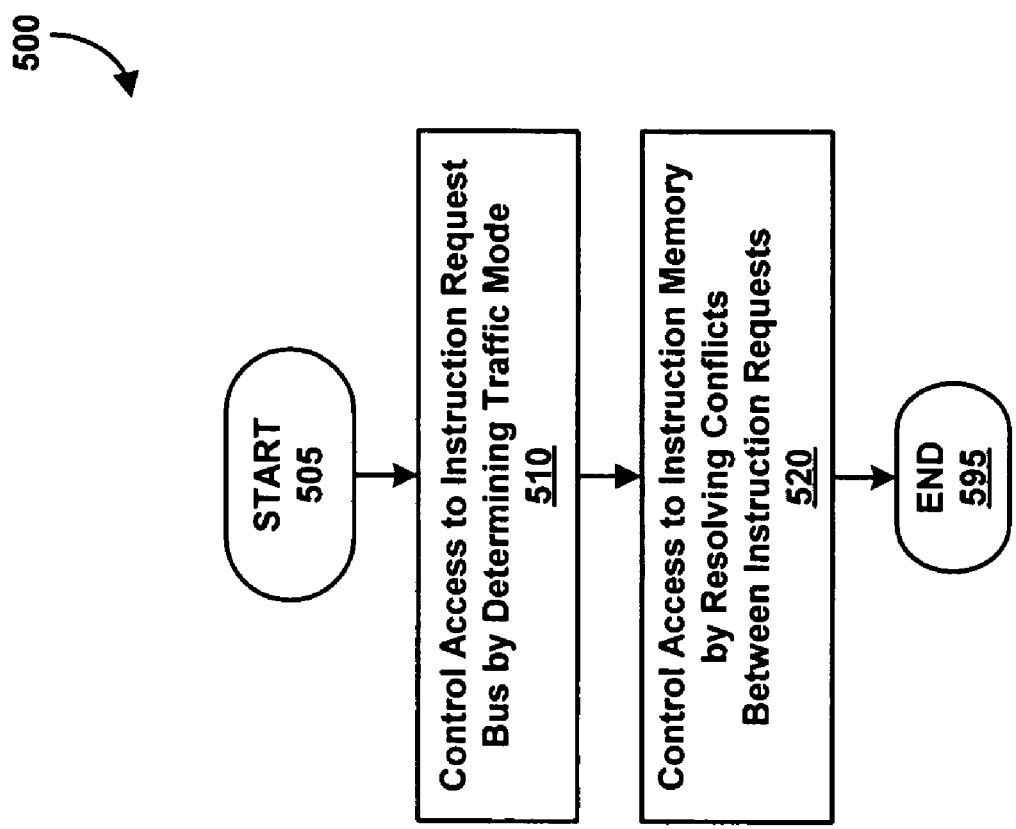
FIG. 5 is a flow chart illustrating a method for controlling instruction requests in the instruction request arbiter according to one embodiment of the present invention.

FIG. 5 is a flow chart illustrating a method 500 for controlling instruction requests in the instruction request arbiter 220 according to one embodiment of the present invention. The bus access module 410 controls 510 access to the instruction request bus 225 by determining a traffic mode as described below with reference to FIG. 6. The memory access module 420 controls 520 access to the instruction memory 230 by resolving conflicts between instruction requests as described below with reference to FIG. 7.

Figure 6:
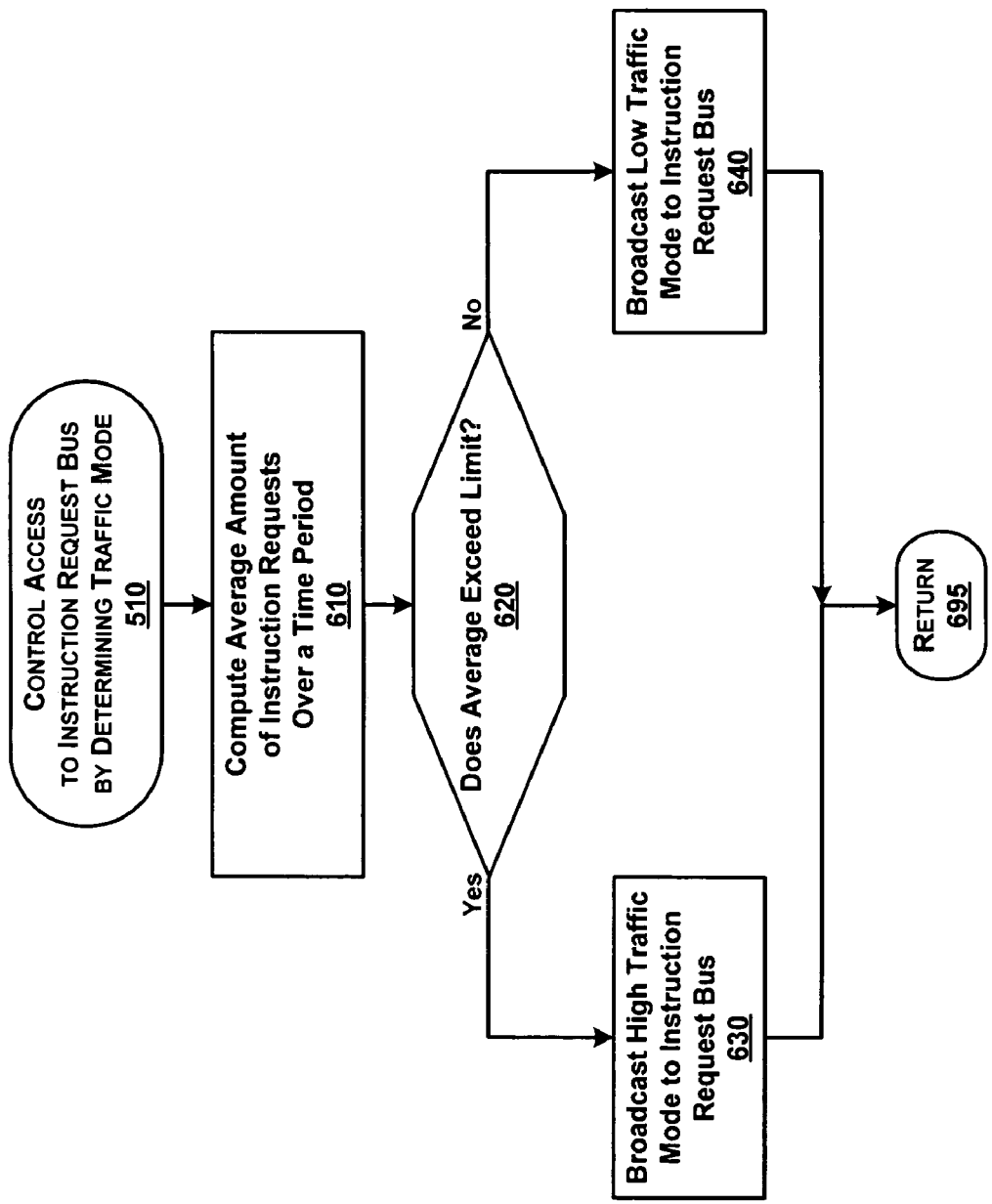
FIG. 6 is a flow chart illustrating the method for determining the traffic mode according to one embodiment of the present invention.

FIG. 6 is a flow chart illustrating the method 510 for determining the traffic mode of the instruction request bus 225 according to one embodiment of the present invention. One of ordinary skill in the art will recognize variations for determining the traffic mode within the scope of the present invention. In FIG. 6, the bus access module 410 computes 610 an average amount of instruction requests over a period of time. In one embodiment, the bus access module 410 counts the number of instruction requests during n cycles for n processing units.

If the average exceeds 620 a limit, the bus access module 410 broadcasts a high traffic mode to the processor clusters 210a–d. In one embodiment, the limit is exceeded when there are n instruction requests during m cycles, and n is, for example, within 10% of m. In another embodiment, high traffic mode is detected when the number of cycles between an oldest and newest entry in an n-deep FIFO is below a threshold. To broadcast the high traffic mode, the bus access module 410 sends a signal to the instruction request bus 225, which stores a traffic mode bit in the flip-flops 215a–e as a control bit sent to the processor clusters 210a–d. The bus access module 410 also sends synchronizing information such as a count or reset information. The processor clusters 210a–d, in response, send instruction requests during scheduled times, such as during an offset to the count.

If the average does not exceed 620 the limit, the bus access module 410 broadcasts 640 a low traffic mode to the processor clusters 210a–d. In this case, the processor clusters 210a–d can send instruction requests whenever they detect an empty slot. For example, the processor clusters 210a–d, can check a bit in associated flip-flops 215a–d that indicates whether an instruction request is already stored, whether the stored instruction request is busy, etc.

Figure 7:
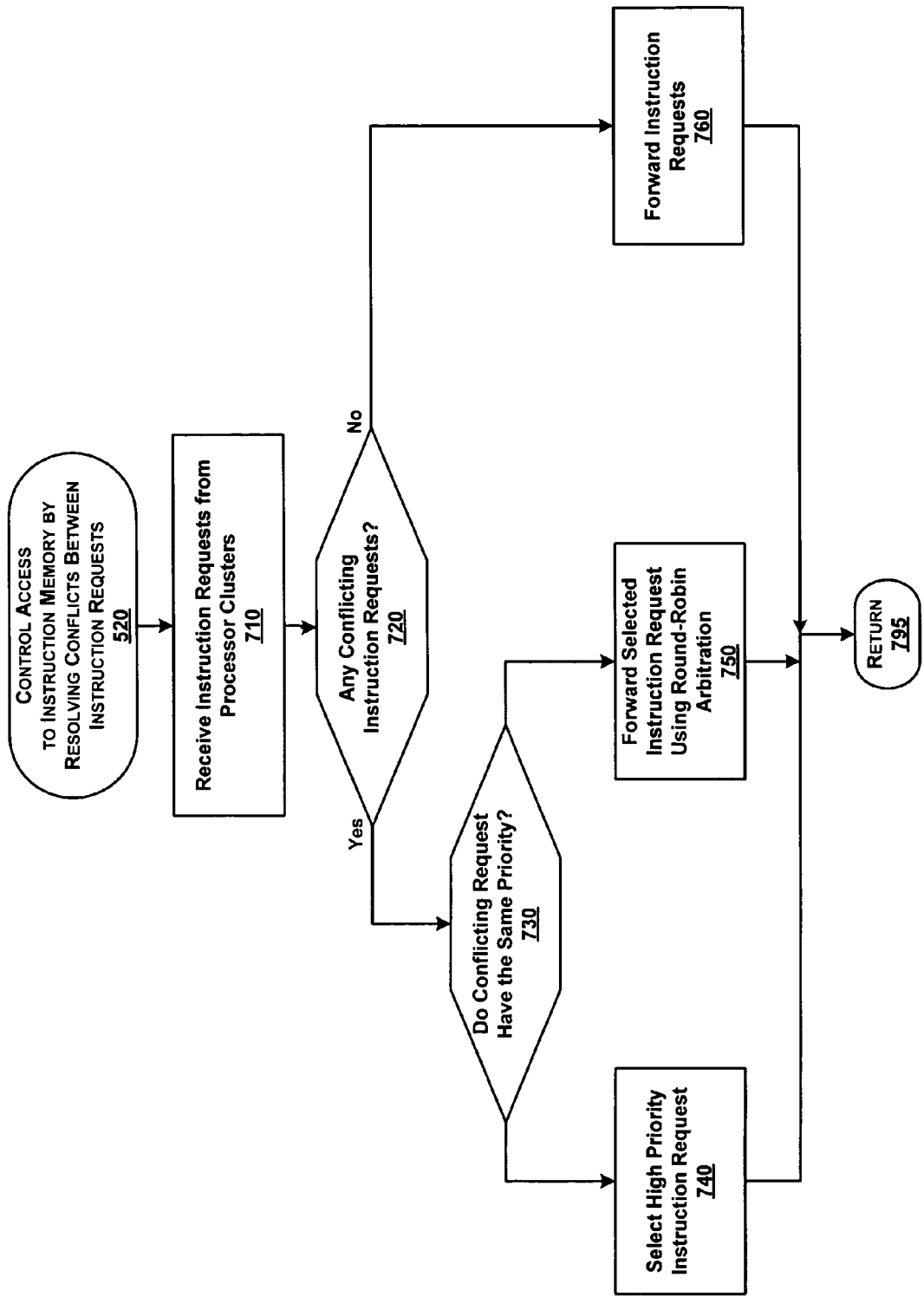
FIG. 7 is a flow chart illustrating the method of resolving conflicts between instruction requests according to one embodiment of the present invention.

FIG. 7 is a flow chart illustrating the method 520 for resolving conflicts between instruction requests according to one embodiment of the present invention. One of ordinary skill in the art will recognize variations of resolving conflicts between conflicting instruction requests within the scope of the present invention. In FIG. 7, the memory access module 420 receives 710 instruction requests from the processor clusters 210a–d. If there are any conflicting requests 720, and the conflicting requests do not have the same priority 730, the memory access module 420 selects 740 the high priority instruction request. In an embodiment of two-priority levels, the low priority instruction is incremented, and possibly saturated, to a higher priority instruction request and recirculated around the instruction request bus 225.

If there are conflicting requests 720 that have the same priority 750, the memory access module 420 selects 750 an instruction request using round-robin arbitration. However, if the instruction requests do not conflict 720, the memory access module 420 forwards the maximum possible instruction requests to the instruction memory 230 without intervention.

IV. Summary

Advantageously, the present invention provides a processor 110 with an instruction memory hierarchy 300 to efficiently distribute packet processing instructions between a plurality of processing units 110 having multithreading capability. An instruction request arbiter 220 controls submissions to the instruction requests bus 225 by broadcasting a traffic mode and resolves conflicts between instruction requests by a priority associated with the instruction requests.

I claim:

1. A processing unit, comprising:
a plurality of processor clusters, each processor cluster having an output to send a signal representing instruction requests, an instruction request responsive to a cache miss by a processing unit within the processor clusters;
an instruction request arbiter, having an input coupled to the outputs of the plurality of processor clusters, the instruction request arbiter controlling access of the plurality of processor clusters to submit instruction requests by broadcasting a traffic mode to the plurality of processor clusters, the instruction request arbiter having a second output coupled to the inputs of the plurality of processor clusters and controlling access to instruction request submissions from the plurality of processor clusters by broadcasting a signal representing a high traffic mode responsive to an average number of instruction requests exceeding a limit, wherein during a high traffic mode, the plurality of processor clusters submit instruction requests during scheduled slots, the instruction request arbiter also detecting conflicts between the instruction requests; and
an instruction memory, having an input coupled to a first output of the instruction request arbiter, the instruction memory sending a signal representing instruction data to the plurality of processor clusters responsive to receiving non-conflicting instruction requests from the instruction request arbiter.

2. The processing unit of claim 1, wherein the instruction request arbiter resolves conflicts between instruction requests having different priority indications by selecting an instruction request with the highest priority.

3. The processing unit of claim 2, wherein a high priority is indicative of an instruction associated with a critical instruction request.

4. The processing unit of claim 2, wherein the instruction request arbiter increments the priority indication of an unselected instruction request.

5. The processing unit of claim 1, wherein the instruction request arbiter resolves conflicts between instruction requests having equal priority indications by using round-robin arbitration.

6. The processing unit of claim 5, wherein the instruction request arbiter increments the priority indication of an unselected instruction request.

7. The processing unit of claim 1, wherein the instruction request arbiter detects the conflicting instruction requests when each instruction request is associated with the same group of cache sets of the instruction memory.

8. The processing unit of claim 1, wherein the instruction request arbiter, having a second output coupled to inputs of the plurality of processor clusters, the instruction request arbiter controlling access to instruction request submissions by broadcasting a signal representing a low traffic mode responsive to an average number of instruction requests within a limit, wherein during low traffic mode, the processor clusters submit instruction requests during empty slots.

9. The processing unit of claim 1, further comprising an instruction request bus, coupled to a second instruction request arbiter output, coupled the plurality of processor cluster outputs, and coupled to the instruction request arbiter input, the instruction request bus comprising a plurality of flip flops to pipeline the instruction requests and the traffic mode.

10. The processing unit of claim 9, wherein the instruction request bus comprises a slotted ring.

11. The processing unit of claim 1, wherein the processing unit comprises a network processor and the instruction data comprises packet processing instructions related to at least one from the group consisting of: packet routing, switching, bridging, and forwarding.

12. The processing unit of claim 1, wherein the plurality of processor clusters comprise a plurality of processing units, each of the processing units submitting requests responsive to a traffic mode.

13. The processing unit of claim 1, wherein at least one of the plurality of processor clusters comprises at least one multithreaded processing unit capable of processing a plurality of instruction threads, each of the plurality of threads submitting instruction requests responsive to a traffic mode.

14. The processing unit of claim 13, wherein the at least one multithreaded processing unit comprises a plurality of multithreaded processing cores, each of the plurality of multithreaded processing cores submitting instruction requests responsive to a traffic mode.

15. A processing unit, comprising:
a plurality of means for cluster processing, each means for cluster processing sending instruction requests, an instruction request responsive to a cache miss by a means for processing within the means for cluster processing;
means for arbitration, coupled to the plurality of means for cluster processing, the means for arbitration controlling access of the plurality of means for cluster processing to submit instruction requests by broadcasting a traffic mode to the plurality of means for cluster processing, the means for arbitration having a second output coupled to the inputs of the plurality of means for cluster processing and controlling access to instruction request submissions from the plurality of means for cluster processing by broadcasting a signal representing a low traffic mode responsive to an average number of instruction requests within a limit wherein during a low traffic mode, the plurality of means for cluster processing submit instruction requests during empty slots the means for arbitration also detecting conflicts between the instruction requests; and
means for storing, coupled to the means for arbitration, the means for storing sending instruction data to the plurality of means for cluster processing responsive to receiving non-conflicting instruction requests from the means for arbitration.

16. The processing unit of claim 15, wherein the means for arbitration resolves conflicts between instruction requests having different priority indications by selecting an instruction request with the highest priority.

17. The processing unit of claim 15, wherein the means for arbitration resolves conflicts between instruction requests having equal priority indications by using round-robin arbitration.

18. The processing unit of claim 15, wherein the means for arbitration detects the conflicting instruction requests when each instruction request is associated with the same group of cache sets of the means for storing.

19. The processing unit of claim 15, wherein the processing unit is a network processor and the instruction data comprises packet processing instructions related to at least one from the group consisting of: packet routing, switching, bridging, and forwarding.

20. In a processing unit having an instruction memory hierarchy, a method for distributing instructions to an plurality of processing units organized in a plurality processor clusters, comprising:
determining a traffic mode for the plurality of processor clusters, an instruction request responsive to a cache miss by a processing unit within a processor cluster;
controlling submissions of instruction requests by each of the processing units by broadcasting the traffic mode to the plurality of processor clusters, including broadcasting a signal representing a high traffic mode responsive to an average number of instruction requests exceeding a limit, wherein during a high traffic mode, the plurality of processor clusters submit instruction requests during scheduled slots;
receiving instruction requests;
detecting conflicts between the instruction requests; and
sending instruction data responsive to non-conflicting instruction requests.

21. The method of claim 20, further comprising:
resolving conflicts between instruction requests having different priority indications by selecting an instruction request with the highest priority.

22. The method of claim 20, wherein a high priority is indicative of an instruction associated with a critical instruction request.

23. The method of claim 21, further comprising:
incrementing the priority indication of an unselected instruction request.

24. The method of claim 20, further comprising:
resolving conflicts between instruction requests having equal priority indications by using round-robin arbitration.

25. The method of claim 24, further comprising:
incrementing the priority indication of an unselected instruction request.

26. The method of claim 20, wherein the detecting the conflicting instruction requests comprises detecting instruction requests associated with a same group of cache sets of an instruction memory.

27. The method of claim 20, wherein the receiving the instruction requests comprises receiving the instruction request during empty slots responsive to a low traffic mode, the low traffic mode responsive to an average number of instruction requests within a limit.

28. The method of claim 20, wherein the receiving the instruction requests comprises receiving a plurality of instruction requests from a plurality of threads associated with the plurality of processing units.

29. The method of claim 28, wherein the receiving the instruction requests comprises receiving a plurality of instruction request from a plurality of threads associated with a plurality of multithreaded processing cores within at least one of the plurality of processing units.

30. An instruction request arbiter, comprising:
means for bus accessing, coupled to receive an indication of instruction requests, the means for bus accessing determining a traffic mode for a plurality of means for cluster processing, the means for bus accessing controlling submissions of instruction requests by broadcasting the traffic mode to the plurality of means for cluster processing, the means for bus accessing having a second output coupled to the inputs of the plurality of means for cluster processing and controlling access to instruction request submissions from the plurality of means for cluster processing by broadcasting a signal representing a high traffic mode responsive to an average number of instruction requests exceeding a limit, wherein during a high traffic mode, the plurality of means for cluster processing submit instruction requests during scheduled slots, an instruction request responsive to a cache miss by a means for processing within the means for cluster processing; and
means for memory accessing, coupled to receive instruction requests, the means for memory accessing forwarding non-conflicting instruction requests.

31. The instruction request arbiter of claim 30, wherein the means for memory accessing resolves conflicts between instruction requests having different priority indications by selecting an instruction request with the highest priority.

32. The instruction request arbiter of claim 31, wherein the means for memory accessing increments the priority indication of an unselected instruction request.

33. The instruction request arbiter of claim 30, wherein the means for memory accessing resolves conflicts between instruction requests having equal priority indications by using round-robin arbitration.

34. The instruction request arbiter of claim 33, wherein the means for memory accessing increments the priority indication of an unselected instruction request.

35. The instruction request arbiter of claim 30, wherein the memory accessing means detects conflicting instruction requests where more than one instruction request is associated with a same group of cache sets of a storing means.

36. The instruction request arbiter of claim 30, wherein the high priority is indicative of an instruction associated with a critical instruction request.

37. The instruction request arbiter of claim 30, wherein the means for bus accessing controls submissions of instruction requests by the plurality of means for cluster processing with a low traffic mode responsive to an average number of instruction request indications within a limit, the low traffic mode indicating that the plurality of means for cluster processing can submit instruction requests during an empty slot.

38. The instruction request arbiter of claim 30, wherein the plurality of means for cluster processing each comprise a plurality of means for processing, and the means for bus accessing controls submissions of instruction requests by each of the means for processing.

39. The instruction request arbiter of claim 38, wherein at least one of the plurality of means for processing comprises a plurality of means for threading, and the means for bus accessing controls submissions of instruction requests by each means threading.

40. An instruction request arbiter, comprising:
a bus access module, having an input coupled to receive signals representing a plurality of instruction request indications, the bus access module determining a traffic mode to control submissions of instruction requests by processor clusters, the bus access module controlling submissions of instruction request by broadcasting the traffic mode to the plurality of processor clusters, the bus access module having a second output coupled to the inputs of the plurality of processor clusters and controlling access to instruction request submissions from the plurality of processor clusters by broadcasting a signal representing a low traffic mode responsive to an average number of instruction requests within a limit, wherein during a low traffic mode, the plurality of processor clusters submit instruction requests during empty slots, an instruction request responsive to a cache miss by a processor within the processor cluster; and
a memory access module, having an input coupled to receive signals representing a plurality of instruction requests, the memory access module forwarding non-conflicting instruction requests.

41. The instruction request arbiter of claim 40, wherein the bus access module resolves conflicts between instruction requests having different priority indications by selecting an instruction request with the highest priority.

42. The instruction request arbiter of claim 40, wherein the memory access module detects conflicting instruction requests where more than one instruction request is associated with the same group of cache sets of a means for storing.

43. The instruction request arbiter of claim 40, wherein the high priority is indicative of an instruction with a critical instruction request.

44. The instruction request arbiter of claim 40, wherein the plurality of processor clusters each comprise a plurality of processing units, and the bus accessing means controls submissions of instruction requests by each processing unit.

45. The instruction request arbiter of claim 44, wherein the plurality of processing units comprise network processing units and the instruction requests comprise requests of packet processing instructions related to at least one from the group consisting of: packet routing, switching, bridging, and forwarding.

46. A processing unit, comprising:
a plurality of processor clusters, each processor cluster having an output to send a signal representing instruction requests, an instruction request responsive to a cache miss by a processing unit within the processor clusters;
an instruction request arbiter, having an input coupled to the outputs of the plurality of processor clusters, the instruction request arbiter controlling access of the plurality of processor clusters to submit instruction requests by broadcasting a traffic mode to the plurality of processor clusters, the instruction request arbiter having a second output coupled to the inputs of the plurality of processor clusters and controlling access to instruction request submissions from the plurality of processor clusters by broadcasting a signal representing a low traffic mode responsive to an average number of instruction requests within a limit, wherein during a low traffic mode, the processor clusters submit instruction requests during empty slots, the instruction request arbiter also detecting conflicts between the instruction requests; and an instruction memory, having an input coupled to a first output of the instruction request arbiter, the instruction memory sending a signal representing instruction data to the plurality of processor clusters responsive to receiving non-conflicting instruction requests from the instruction request arbiter.

47. A processing unit, comprising:

a plurality of means for cluster processing, each means for cluster processing sending instruction requests, an instruction request responsive to a cache miss by a means for processing within the means for cluster processing;

means for arbitration, coupled to the plurality of means for cluster processing, the means for arbitration controlling access of the plurality of means for cluster processing to submit instruction requests by broadcasting a traffic mode to the plurality of means for cluster processing, the means for arbitration having a second output coupled to the inputs of the plurality of means for cluster processing and controlling access to instruction request submissions from the plurality of means for cluster processing by broadcasting a signal representing a high traffic mode responsive to an average number of instruction requests exceeding a limit, wherein during a high traffic mode, the plurality of means for cluster processing submit instruction requests during scheduled slots, the means for arbitration also detecting conflicts between the instruction requests; and means for storing, coupled to the means for arbitration, the means for storing sending instruction data to the plurality of means for cluster processing responsive to receiving non-conflicting instruction requests from the means for arbitration.

48. In a processing unit having an instruction memory hierarchy, a method for distributing instructions to an plurality of processing units organized in a plurality processor clusters, comprising:

determining a traffic mode for the plurality of processor clusters, an instruction request responsive to a cache miss by a processing unit within a processor cluster;

controlling submissions of instruction requests by each of the processing units by broadcasting the traffic mode to the plurality of processor clusters, including broadcasting a signal representing a low traffic mode responsive to an average number of instruction requests within a limit, wherein during a low traffic mode, the plurality of processor clusters submit instruction requests during empty slots;

receiving instruction requests;

detecting conflicts between the instruction requests; and sending instruction data responsive to non-conflicting instruction requests.

* * * * *